United States Patent
Battaglia et al.

(10) Patent No.: US 9,600,502 B1
(45) Date of Patent: Mar. 21, 2017

(54) EVALUATING A DATABASE DESIGN AND MODIFICATIONS THERETO

(71) Applicant: International Business Machines Corporation, Armonk, NY (US)

(72) Inventors: Michael Battaglia, Yorktown Heights, NY (US); Heather Smith, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/017,857

(22) Filed: Feb. 8, 2016

(51) Int. Cl.
*G06F 17/30* (2006.01)

(52) U.S. Cl.
CPC .... *G06F 17/30297* (2013.01); *G06F 17/3053* (2013.01)

(58) Field of Classification Search
CPC .................. G06F 17/30297; G06F 17/3053
See application file for complete search history.

(56) References Cited

U.S. PATENT DOCUMENTS

| | | | | |
|---|---|---|---|---|
| 2005/0289115 A1* | 12/2005 | Garden | ............ | G06F 17/30297 |
| 2011/0138039 A1* | 6/2011 | Good | ............... | G06F 17/30525 |
| | | | | 709/224 |
| 2015/0269154 A1 | 9/2015 | Bhagavan et al. | | |
| 2015/0293952 A1* | 10/2015 | Ogrinz | ............ | G06F 17/30575 |
| | | | | 707/702 |

OTHER PUBLICATIONS

Ramirez et al. ("Performance Analysis of "What-If" Databases Using Independently Updated Views", 1992, Journal of Management Information Systems/ Summer 1992, pp. 185-203.*
Anonymously, "A Method and System for Creating an Enterprise Wide Database Prtofolio Value", IPCOM000243495D, Sep. 24, 2015, p. 1-5.
Anonymously,"A Method for Allocating and Using Database Design Score Credits", IPCOM000242956D, Sep. 2, 2015, p. 1-6.

* cited by examiner

*Primary Examiner* — Mark E Hershley
*Assistant Examiner* — Alexander Khong
(74) *Attorney, Agent, or Firm* — Cantor Colburn LLP; Kurt Goudy

(57) ABSTRACT

Embodiments include method, systems and computer program products for evaluating a database design. Aspects include receiving a first database definition for a first database comprising multiple database object definitions; receiving database design rules; calculating object scores representing a compliance between the database object definitions with the database design rules; calculating a first database score based on the object scores; receiving a second database definition for a proposed modification to the first database, wherein the second database definition includes modified database object definitions; calculating object scores representing a compliance between the modified database object definitions of the second database definition with the one or more database design rules; calculating a second database score based on the object scores; displaying the first and second database score; displaying a cause of a difference between the first and second database scores; and receiving an indication of whether to implement the second database definition.

20 Claims, 7 Drawing Sheets

BASELINE 639

CREATE TABLE EMP.ADDRESS
(
PERSON_ID SMALLINT NOT NULL
,ADDR01_L1 VARCHAR (100)
,ADDR01_L2 VARCHAR (100)
,ADDR01_L3 VARCHAR (100)
,ADDR02_L1 VARCHAR (100)
,ADDR02_L2 VARCHAR (100)
,ADDR02_L3 VARCHAR (100)
,ADDR03_L1 VARCHAR (100)
,ADDR03_L2 VARCHAR (100)
,ADDR03_L3 VARCHAR (100)
);

310

VERSION 001

CREATE TABLE EMP.ADDRESS
(
PERSON_ID SMALLINT NOT NULL
,ADDR01_L1 VARCHAR (100)
,ADDR01_L2 VARCHAR (100)
,ADDR01_L3 VARCHAR (100)
,ADDR02_L1 VARCHAR (100)
,ADDR02_L2 VARCHAR (100)
,ADDR02_L3 VARCHAR (100)
,~~ADDR03_L1 VARCHAR (100)~~
,~~ADDR03_L2 VARCHAR (100)~~
,~~ADDR03_L3 VARCHAR (100)~~
);
Version 001 new score 639
No improvement

```
VERSION 002

CREATE TABLE EMP.ADDRESS
(
 PERSON_ID BIGINT NOT NULL
 CONSTRAINT FK_PERSON
 FOREIGN KEY EMP.PERSON
 ,ADDR_TYPE CHAR(01) NOT NULL
 CONSTRAINT FK_ADDR_CODE FOREIGN
 KEY EMP.ADDR_CODE
 ,ADDR_L1 VARCHAR (100)
 ,ADDR_L2 VARCHAR (100)
 ,ADDR_L3 VARCHAR (100)
)
;
CREATE TABLE EMP.ADDR_CODE
(
 ADDR_TYPE CHAR(01) NOT NULL
 CONSTRAINT PK_ADDR_TYPE
 PRIMARY KEY
 ,ADDR_DESC VARCHAR(100) NOT NULL
)
;
Version 002 new score 750
Improvement
```
312

```
BASELINE 639

CREATE TABLE EMP.ADDRESS
(
 PERSON_ID SMALLINT NOT NULL
 ,ADDR01_L1 VARCHAR (100)
 ,ADDR01_L2 VARCHAR (100)
 ,ADDR01_L3 VARCHAR (100)
 ,ADDR02_L1 VARCHAR (100)
 ,ADDR02_L2 VARCHAR (100)
 ,ADDR02_L3 VARCHAR (100)
 ,ADDR03_L1 VARCHAR (100)
 ,ADDR03_L2 VARCHAR (100)
 ,ADDR03_L3 VARCHAR (100)
)
;
```
310

FIG. 3C

EVALUATING A DATABASE DESIGN AND MODIFICATIONS THERETO

BACKGROUND

The present invention relates to evaluating database designs, and more specifically, to evaluating database design changes to an existing database and comparing results against a baseline database score.

Database management systems are powerful tools that are used for storing and organizing large amounts of data. The internet era has created an explosion of data generation and storage creating data management issues never encountered before and placing huge burdens on traditional database tools. To be properly implemented, databases are designed depending on the volume of data stored in the database, the desired access speed, the type of use of the database and the database platform.

Databases exist in almost every industry field as the need to store and manage large amounts of data has become important for success of an organization. However, as often is the case, trained database architects are becoming rare. There is a need to empower novice individuals with the tools to implement database changes in real time. It is also important to see, before implementation, the effect the changes will have on a database because of changes made.

Accordingly, a general object of the present invention is to provide a mechanism to evaluate proposed changes to existing database.

BRIEF SUMMARY

In accordance with an embodiment, a method for evaluating a database design is provided. The method includes receiving, by a processing device, a first database definition representing a first database, wherein the first database definition comprises one or more database object definitions; receiving one or more database design rules; calculating object scores representing a compliance between each of the one or more database object definitions of the first database definition with the one or more database design rules; calculating a first database score based on the object scores corresponding to the first database definition; receiving, by the processing device, a second database definition representing a proposed modification to the first database, wherein the second database definition includes one or more modified database object definitions; calculating object scores representing a compliance between each of the one or more modified database object definitions of the second database definition with the one or more database design rules; calculating a second database score based on the object scores corresponding to the second database definition; displaying, to a user, the first database score and the second database score; displaying a cause of a difference between the first database score and the second database score; and receiving, from the user, an indication of whether to implement the second database definition.

Embodiments also include a computer program product for evaluating a database design, the computer program product including a non-transitory computer readable storage medium having computer readable program code embodied therewith. The computer readable program code including computer readable program code configured to perform a method. The method includes receiving, by a processing device, a first database definition representing a first database, wherein the first database definition comprises one or more database object definitions; receiving one or more database design rules; calculating object scores representing a compliance between each of the one or more database object definitions of the first database definition with the one or more database design rules; calculating a first database score based on the object scores corresponding to the first database definition; receiving, by the processing device, a second database definition representing a proposed modification to the first database, wherein the second database definition includes one or more modified database object definitions; calculating object scores representing a compliance between each of the one or more modified database object definitions of the second database definition with the one or more database design rules; calculating a second database score based on the object scores corresponding to the second database definition; displaying, to a user, the first database score and the second database score; displaying a cause of a difference between the first database score and the second database score; and receiving, from the user, an indication of whether to implement the second database definition.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 3B, 3C and 3D depict graphical representations of prototyping a database design according to an embodiment.

DETAILED DESCRIPTION

Embodiments disclosed herein are directed to a method of evaluating a database design and proposed modifications thereto. In exemplary embodiments, a baseline database score is calculated for an active database and additional database scores are calculated for proposed modifications to the existing database design. The database scores are based on the compliance of the database designs with a scoring knowledge database, which contains design rules based off of accepted best practices for database design. In further embodiments, the database scores are calculated by creating weighted scores for the database objects representing the compliance of these database objects with the scoring knowledge database. The database object scores are then used to calculate the database scores.

Figure 1:
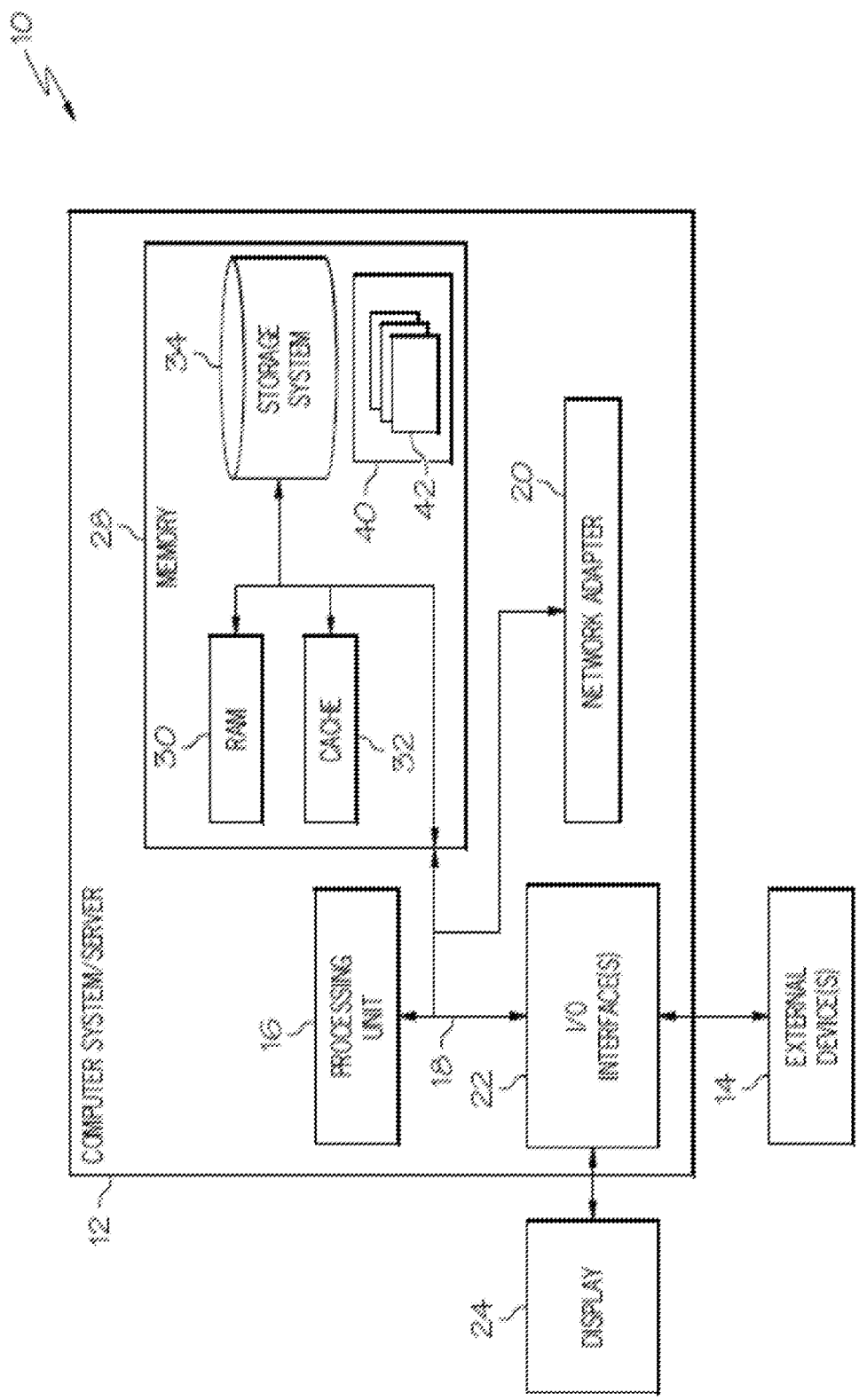
FIG. 1 depicts a block diagram of a computer system according to an embodiment.

Referring now to FIG. 1, a block diagram of a computer system 10 suitable for prototyping design changes to a database and comparing results against a baseline database score according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a general-purpose computing device, also referred to as a processing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
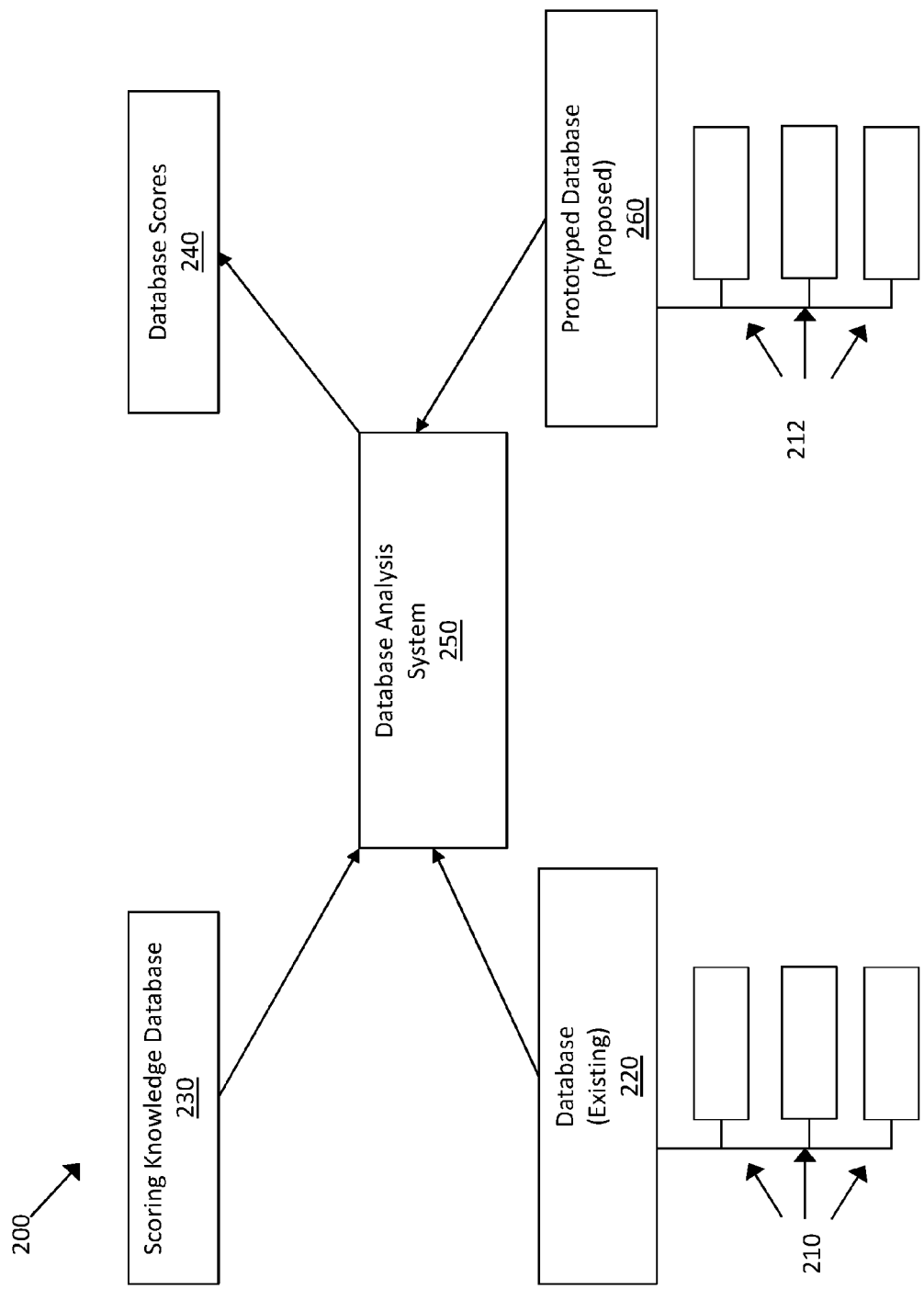
FIG. 2 depicts a graphical representation of a system for optimizing a database score according to an embodiment.

FIG. 2 is a block diagram illustrating a system 200 for evaluating a database design and changes thereto by calculating database scores in accordance with an exemplary embodiment. As illustrated, the system 200 includes an existing database 220 which contains database definition statements 210. The system 200 also includes a database analysis system 250 which communicates with a scoring knowledge database 230. The database analysis system 250 is configured to compare the database definition statements 210 of the existing database 220 to the scoring knowledge database 230. Based on the comparison of the database definitions statements 210 to the rules within the scoring knowledge database 230, the database analysis system 250 calculates a database score 240. The database score 240 of the existing database 220 is referred to as a baseline score. The system 200 may also include a proposed, or prototyped, database 260 which contains modified database definition statements 212. The database analysis system 250 can compare the modified database definition statements 212 with the scoring knowledge database 230 to compute a database score 240.

In exemplary embodiments, the database definition statements are presented to the database analysis system 250. The database definitions statements are made up of one or more database object definitions that define objects and relationships within a database, such as a table.

In exemplary embodiments, the database score 240 for a database definition is calculated by using various decision trees, measurements, and scores for each type of database object definition contained within the database definition. An object score may be assigned to each database definition statements and a combined score of these object scores can be used to create a single score for the database design. In one embodiment, the database analysis system 250 calculate a weighted score based on all of the object scores and generate a single numerical value which represents the database score 240. The baseline database score can be compared to the proposed or prototyped database score to determine whether to implement the proposed changes to the existing database.

In exemplary embodiments, the determination of whether to implement the proposed changes to the existing database will be at the discretion of the end user. The end user will receive back the new score for the proposed design and the reasons for the difference in the score.

In exemplary embodiments, the scoring knowledge database 230 includes database design rules that are based upon accepted best practices for database design. Accepted best practices include a set of quality indicators such as the presence of a primary key, the presence of a foreign key, consistency of name suffixes and prefixes, or the like. In exemplary embodiments, the database design rules within the scoring knowledge database 230 may include a ranking, or weighted value, associated with the design rule. For example, a fundamental rule violation, such as the absence of a primary key within a table object, may carry a heavier penalty than a less fundamental or less important rule.

The database score 240 of the existing database 220 will be used as a baseline database score which may be compared to any and all future changes to the database or database definition statements. In exemplary embodiments, the database definition statements 210 may contain database object definitions. The database object definitions may be compared to the database design rules within the scoring knowledge database 230. For example, if the system 200 is presented with a database object definition for a table, the scoring analysis for the scoring knowledge database 230 could follow a decision tree. In exemplary embodiments, a decision tree for a table may ask about the presence of a foreign key within a table database object definition. If there is a foreign key, the decision tree may ask if each foreign key has an index to back it up. If the foreign key does not have an index to back it up, points may be deducted by the scoring knowledge database 230 and will be reflected in the database score 240.

In one embodiment, the database score 240 may start from zero and add scores for rule violations where the higher the score, the worse the design of the database. In another embodiment, the database score 240 may begin at a value and then deduct points from that value based upon design rules violations to achieve the final database score 240. In that example, the higher the score, the better the design of the database. In exemplary embodiments, a user, such as a database administrator, can customize the rankings provided in the scoring knowledge database such that certain design rules violations are ranked higher and a violation of these certain design rules would have a greater impact on the database score. In another embodiment, the user can rely on a default scoring scheme that is provided with the scoring knowledge database 230 without making any modifications or customizations. Additionally, the user can customize the database analysis system 250 such that multiple violations of a single database design rule may not impact the score as much as violations of multiple different design rules.

Figure 3A:
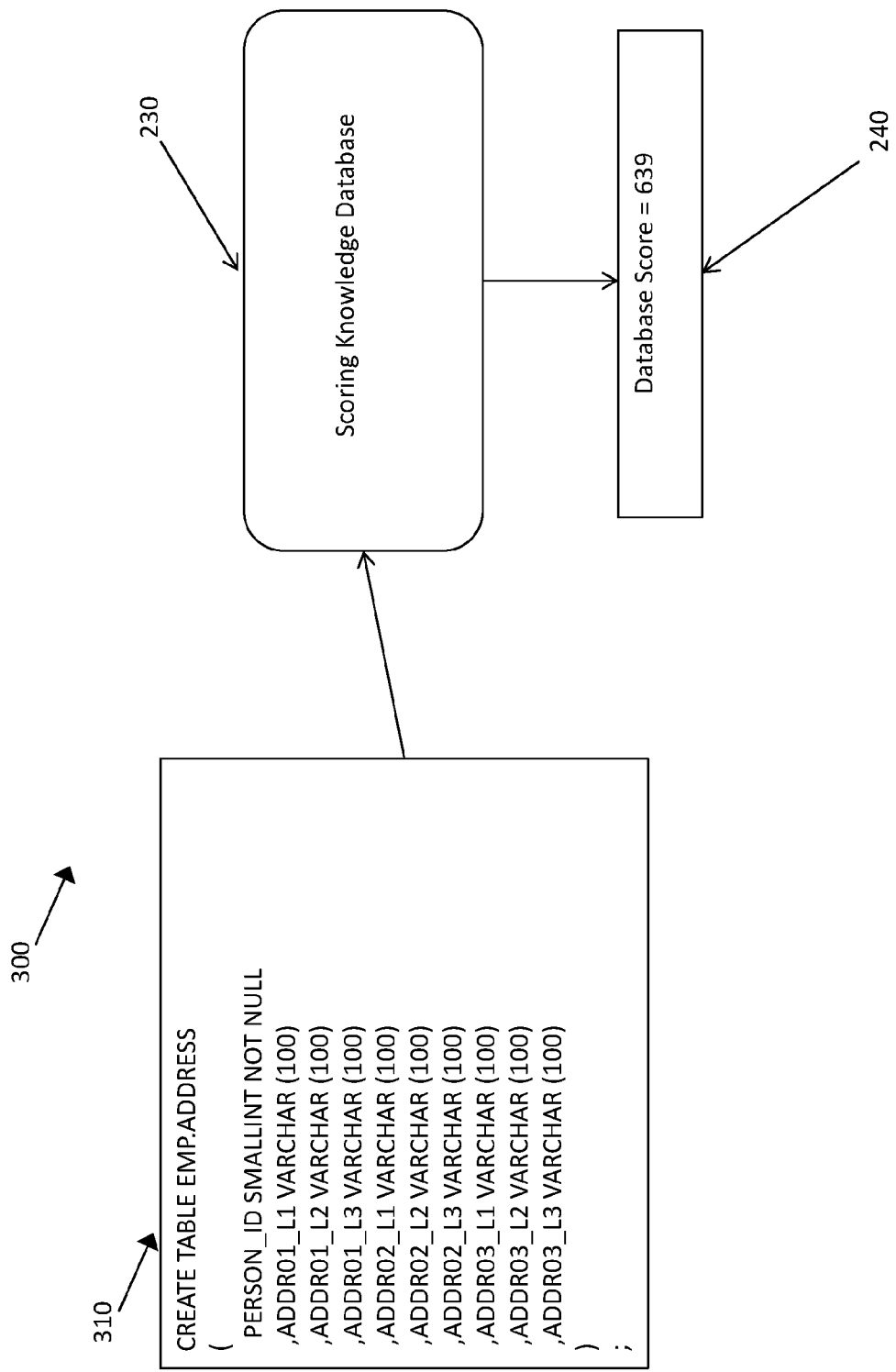
FIG. 3A depicts a graphical representation of a database design definition statement and a database score according to an embodiment.

FIG. 3A is a diagram illustrating an example scoring process 300 for evaluating design changes with database scoring in accordance with an exemplary embodiment. As shown in FIG. 3A, a database definition statement 310 that can be created by a processing device of the computer system, such as the one shown in FIG. 1, is shown. The database definition statement 310 is then evaluated for compliance with a scoring knowledge database 230 to create a database score 240. As shown in the exemplary embodiment of FIG. 3A, the database definition statement 310 is an address table containing three different address fields. In an exemplary embodiment, a user of a computer system can create and view the database definition statement 310 and make changes in real time based upon a particular need or use of the database. For example, a human resources database administrator may evaluate a database definition statement 310 to decide where changes need to be made. In this example, the database definition 310 is a table for employee addresses. The database definition 310 is then evaluated through the scoring knowledge database 230. The human resources database manager will receive a database score 240. In this example, the database score 240 is a total of 639. In exemplary embodiments, the database score 240 is treated as a base line score for comparison with changes to the database definition statement 310. In the example, the human resource manager may determine that having three fields for employee addresses may be too many as most employees have a maximum of two or sometimes even one.

FIG. 3B is a diagram showing the baseline database definition statement 310 with a database score of 639. In exemplary embodiments, a new version of the database definition statement 311 is prototyped using a database analysis system 250. This new version of the database definition statement 311 can receive a database score 240 after being reviewed by the scoring knowledge database 230. Revisiting the human resources database administrator example, an HR database administrator can utilize the baseline database score of 639 to compare to future database design changes. As illustrated in FIG. 3B, the employee addresses fields (EMP.ADDRESS) have fields for a total of three addresses (ADDR01_L1, etc.) for each employee field. The prototype definition statement 311, shows the elimination of the third address field. This prototype definition 311 is then scored utilizing the scoring knowledge database 230. As illustrated in FIG. 2B, the database score remains unchanged at 639. In exemplary embodiments, some possible explanations for the unchanged database score include PERSO_N ID is a PRIMARY KEY in Table EMP.PERSON., verify whether a FOREIGN KEY should be added, PERSON_ID is defined in another table with different attributes, and/or there appear to be repeating data elements, Columns ADDR % may be repeating.

FIG. 3C is a diagram showing the baseline database definition statement 310 with a database score of 639. In an exemplary embodiment, a second new version of the database definition statement 312 is prototyped using a database analysis system 250. This second new version of the database definition statement 312 receives a database score 240 after being compared to the scoring knowledge database 230. Revisiting the human resources database administrator example, a HR database administrator can utilize the database score of 639 to compare to this new prototyped database definition statement 312.

With reference to FIG. 3C, a database definition statement 310 created by an embodiment of the processing device 16 of computer system 10 is generally shown. As shown in FIG. 3C, the database definition statement 310 shows the database definition of a table for address data. The prototyped database definition statement 312 reflects a multitude of possible changes to the database definition statement 310. This prototyped database definition statement 312 shows a new database score 240 reflecting an improvement over the baseline score to 750. Revisiting the human resources example, with the improved score for the prototyped database design definition statement, the human resources database administrator would know that this new design would be better to implement over the current database. In addition, the human resources database administrator can include inline attribute extensions to explain their design choices.

Figure 3D:
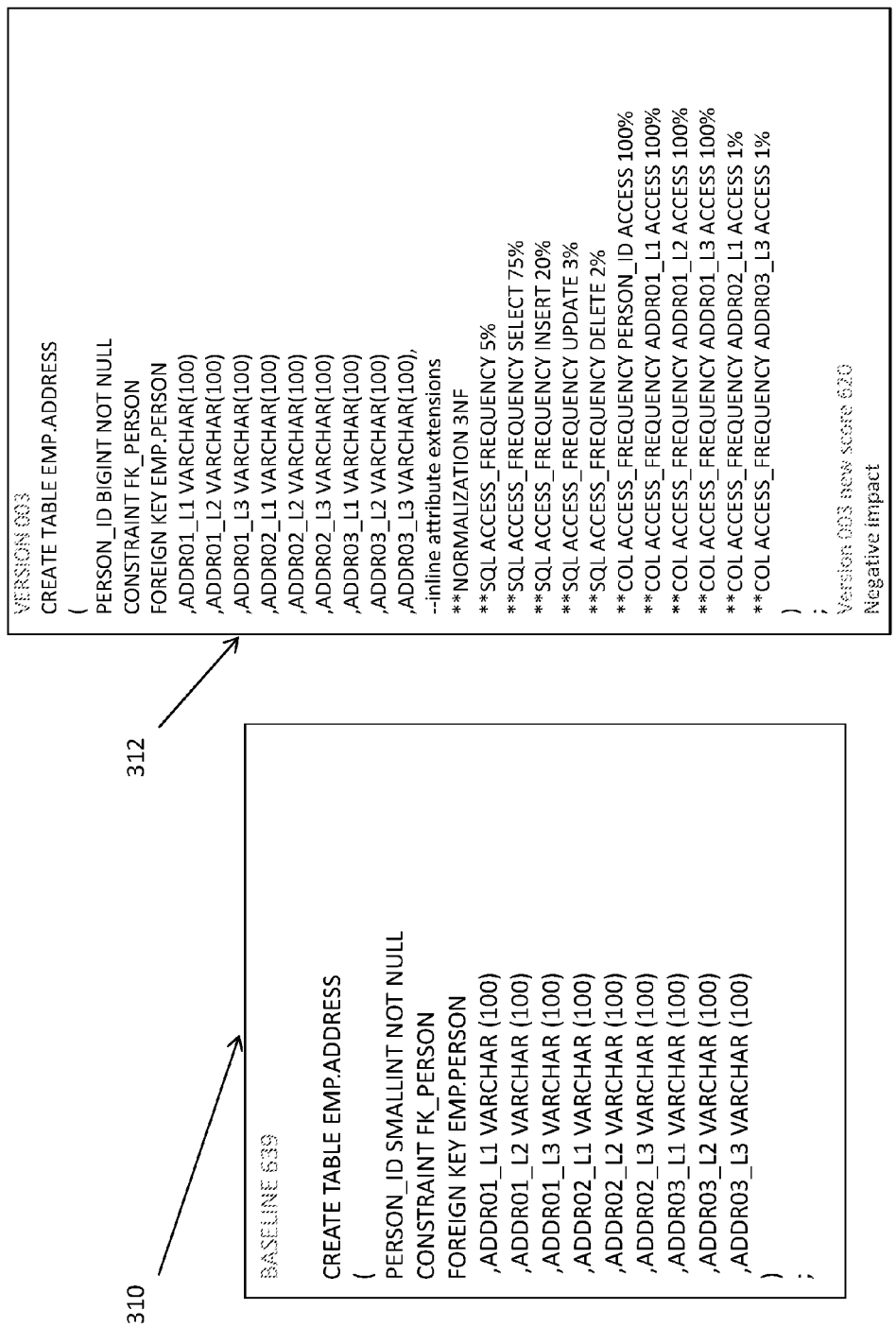

With reference to FIG. 3D a database definition statement 310 created by an embodiment of the processing device 16 of computer system 10 is generally shown. As shown in FIG. 3D, the database definition statement 310 shows the database definition of a table for address data. The prototyped database definition statement 313 reflects inline attribute extensions that are overriding attributes of a database object that the scoring knowledgebase will use to take a different path in scoring best practices. For example the frequency of access of a repeating column or the level of normalization to be scored against. This prototyped database definition statement 313 shows a new database score 240 reflecting a negative impact over the baseline score to 620. Revisiting the human resources example, with the negative impact on the score for the prototyped database design definition statement, the human resources database administrator would know that the solution in FIG. 3C would be a better database design.

In an embodiment, inline attribute extensions allow for the ability for an end user to describe frequency of access attributes as they relate to a database, a table and columns. As shown in FIG. 3D, the database definition statement 312 shows a variety of ways an end user can explain access patterns to the specific table object. In an embodiment, by including the inline attribute extensions with the create table statement, a user is able to further explain supporting information towards the table definition. Here, the database definition 312 is explaining that the EMP.ADDRESS table is required to be in third normal form based on the NORMALIZATION extension. The statement ACCESS_FREQUENCY is defining the expected overall table usage as weighted against all tables in the database. When the ACCESS_FREQUENCY command includes an ACCESS_TYPE (SELECT, UPDATE, INSERT, or DELETE), this defines the expected type of SQL that will access the specific table. When the ACCESS_FREQUENCY command includes a column name, this defines the expected frequency that this column will be included in any SQL statement that accesses this table. The knowledgebase takes these extensions as a higher precedence than its standard set of best practices.

Figure 4:
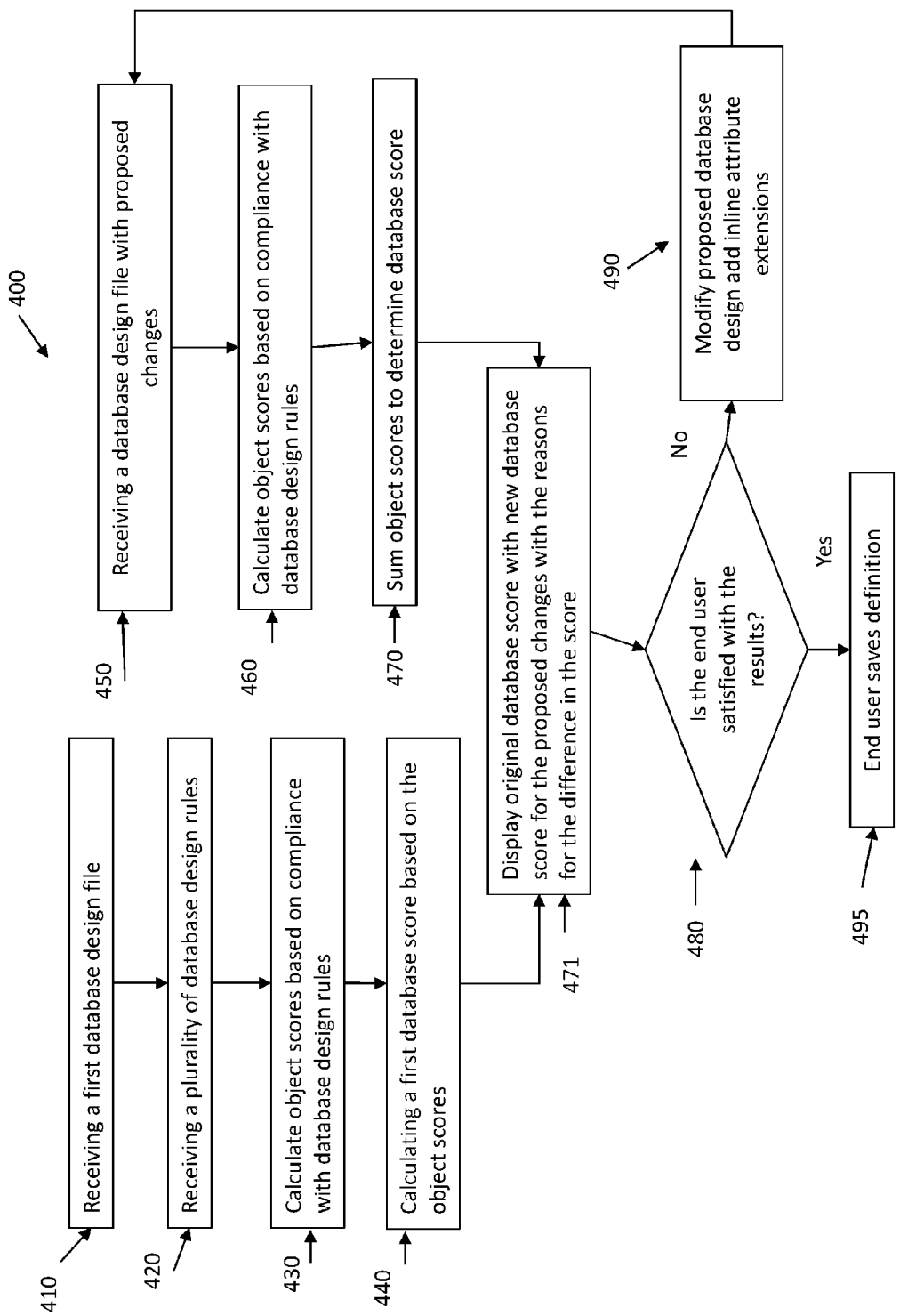
FIG. 4 depicts a flow diagram of a method for optimizing a database score according to an embodiment.

FIG. 4 is a flow diagram of a method 400 for evaluating a database design in accordance with an exemplary embodiment. As shown at block 410, the method 400 includes receiving a first database definition. In exemplary embodiments, the first database definition is a design file for an active database that contains one or more database definition statements that define the structure of the database. Next, at block 420, the method 400 includes receiving a plurality of database design rules. In exemplary embodiments, the plurality of database design rules include accepted best practices such as a set of quality indicators such as the presence of a primary key, the presence of a foreign key, consistency of name suffixes and prefixes, or the like. Object scores for the one or more database definition statements are then calculated based on compliance with the database design rules, as shown at block 430.

Next, as shown at block 440, the method 400 includes calculating a first database score based on the object scores. Also, as shown at block 450, the method 400 includes receiving a second database definition with proposed changes to the one or more database definition statements of the first database. Object scores for the one or more proposed database definition statements are then calculated based on compliance with the database design rules, as shown at block 460. Next, as shown at block 470, a database score for the second database definition is calculated based on the object scores proposed changes the object scores for the one or more proposed database definition statements. Next, as shown at block 471 the end user is provided with the original database score, the new database score for the proposed changes with the reasons for the difference in the database score.

Next, as shown at decision block 480, the end user decides if they are satisfied with the results. If the end user is satisfied with the results, the method 400 proceeds to block 495 and the end user saves the proposed changes. If the end user is not satisfied with the results, the method 400 proceeds to block 490 where they modify the database definition and optionally add inline attribute extensions and then proceeds to block 450 to resubmit the proposed changes.

In exemplary embodiments, the database analysis system is configured to notify a database administrator of the database score via a communication such as email. In exemplary embodiments, the system 200 may schedule implementation of any changes to the database based upon the database scores 240. In exemplary embodiments, the implementation can be immediate or it can be scheduled for a later time, such as when the database is offline or at low access times. In exemplary embodiments, based upon the threshold value, the notification may indicate an urgency for updating the database with the proposed changes. For example, if the threshold value is exceeded by a large amount, the database administrator may be notified and given a directive to implement the changes with urgency. Also for example, if the threshold value is exceeded by only a small amount, the databases administrator may be notified to implement the changes in a non-urgent time period.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for evaluating database designs comprising:
   receiving, by a processing device, a first database definition representing a first database, wherein the first database definition comprises one or more database object definitions;
   receiving one or more database design rules;
   calculating object scores representing a compliance between each of the one or more database object definitions of the first database definition with the one or more database design rules;
calculating a first database score based on the object scores corresponding to the first database definition;
receiving, by the processing device, a second database definition representing a proposed modification to the first database, wherein the second database definition includes one or more modified database object definitions;
calculating object scores representing a compliance between each of the one or more modified database object definitions of the second database definition with the one or more database design rules;
calculating a second database score based on the object scores corresponding to the second database definition;
displaying, to a user, the first database score and the second database score;
displaying a cause of a difference between the first database score and the second database score; and
receiving, from the user, an indication of whether to implement the second database definition.

2. The method of claim 1, wherein the first database is an active database.

3. The method of claim 1, wherein the one or more database design rules comprise a decision tree of database design best practices, wherein each of the one or more database design rules includes a ranking based on an importance of the one or more database design rules.

4. The method of claim 1, wherein the calculating the first database score is performed by creating a weighted average of the object scores representing the compliance between each of the one or more database object definitions of the first database definition.

5. The method of claim 1, wherein calculating the second database score is performed by creating a weighted average of the object scores representing the compliance between each of the one or more modified database object definitions of the second database definition.

6. The method of claim 1, wherein calculating the first database score is based upon a summation of the object scores representing the compliance between each of the one or more database object definitions of the first database definition.

7. The method of claim 1, wherein the calculating the second database scores is based upon a summation of the object scores representing the compliance between each of the one or more modified database object definitions of the second database definition.

8. The method of claim 1, further comprising receiving, from the user, a plurality of inline attribute extensions, wherein the plurality of inline attribute extensions describe a motivation for an implementation decision.

9. A system for evaluating database designs, the system comprising:
a processor configured to:
receive a first database definition representing a first database, wherein the first database definition comprises one or more database object definitions;
receive one or more database design rules;
calculate object scores representing a compliance between each of the one or more database object definitions of the first database definition with the one or more database design rules;
calculate a first database score based on the object scores corresponding to the first database definition;
receive a second database definition representing a proposed modification to the first database, wherein the second database definition includes one or more modified database object definitions;
calculate object scores representing a compliance between each of the one or more modified database object definitions of the second database definition with the one or more database design rules;
calculate a second database score based on the object scores corresponding to the second database definition;
display, to a user, the first database score and the second database score;
display a cause of a difference between the first database score and the second database score; and
receive, from the user, an indication of whether to implement the second database definition.

10. The system according to claim 9, wherein the first database is an active database.

11. The system according to claim 9, wherein the one or more database design rules comprise a decision tree of database design best practices, wherein each of the one or more database design rules includes a ranking based on an importance of the one or more database design rules.

12. The system according to claim 9, wherein calculating the first database score is performed by creating a weighted average of the object scores representing the compliance between each of the one or more database object definitions of the first database definition.

13. The system according to claim 9, wherein calculating the second database score is performed by creating a weighted average of the object scores representing the compliance between each of the one or more modified database object definitions of the second database definition.

14. The system according to claim 9, wherein calculating the first database score is based upon a summation of the object scores representing the compliance between each of the one or more database object definitions of the first database definition.

15. The system according to claim 9, wherein calculating the second database scores is based upon a summation of the object scores representing the compliance between each of the one or more modified database object definitions of the second database definition.

16. A computer program product for evaluating database designs, the computer program product comprising a computer readable storage medium having program instruction embodied therewith, wherein the computer readable storage medium is not a transitory signal per se, the program instructions executable by a processor to cause the processor to perform a method comprising:
receiving, by the processor, a first database definition representing a first database,
wherein the first database definition comprises one or more database object definitions;
receiving one or more database design rules;
calculating object scores representing a compliance between each of the one or more database object definitions of the first database definition with the one or more database design rules;
calculating a first database score based on the object scores corresponding to the first database definition;
receiving, by the processor, a second database definition representing a proposed modification to the first database, wherein the second database definition includes one or more modified database object definitions;
calculating object scores representing a compliance between each of the one or more modified database object definitions of the second database definition with the one or more database design rules;

calculating a second database score based on the object scores corresponding to the second database definition;

displaying, to a user, the first database score and the second database score;

displaying a cause of a difference between the first database score and the second database score; and receiving, from the user, an indication of whether to implement the second database definition.

17. The computer program product of claim 16, wherein the first database is an active database.

18. The computer program product of claim 16, wherein the calculating the first database score is performed by creating a weighted average of the object scores representing the compliance between each of the one or more database object definitions of the first database definition.

19. The computer program product of claim 16, wherein calculating the second database score is performed by creating a weighted average of the object scores representing the compliance between each of the one or more modified database object definitions of the second database definition.

20. The compute program product of claim 16, wherein calculating the first database score is based upon a summation of the object scores representing the compliance between each of the one or more database object definitions of the first database definition.

* * * * *